Patented Nov. 6, 1951

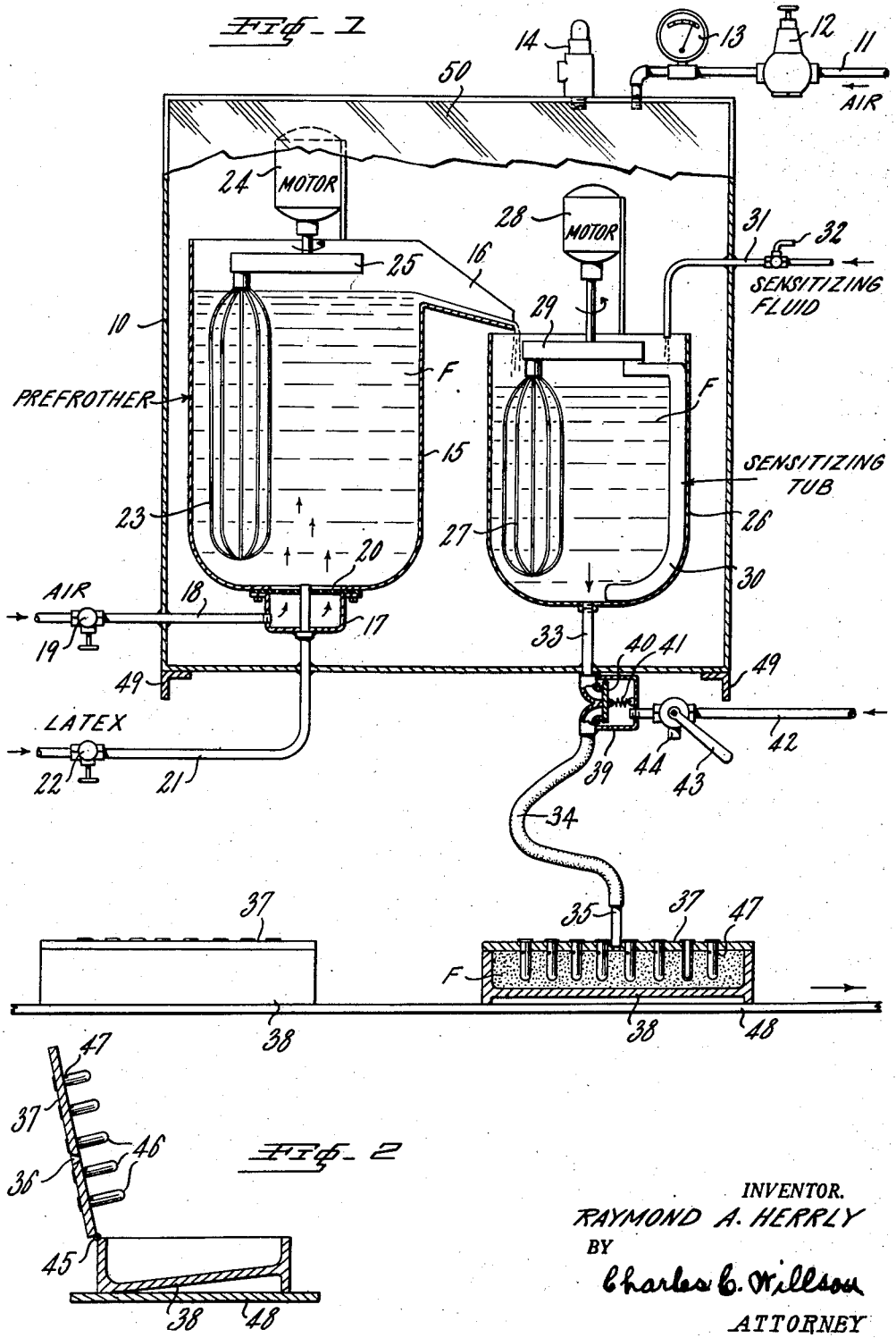

2,574,391

UNITED STATES PATENT OFFICE 2,574,391

APPARATUS FOR FILLING MOLDS WITH FOAMED LATEX

Raymond A. Herrly, South Bend, Ind., assignor to United States Rubber Company, New York, N. Y., a corporation of New Jersey Application June 15, 1948, Serial No. 33,070

2 Claims. (Cl. 18—30)

This invention relates to apparatus for filling vulcanizing molds with foamed latex or other foamed dispersion of rubber-like material, and more particularly to apparatus for forcing the foamed latex into a closed mold to fill the mold completely without unduly crushing the foam.

It is old to produce foamed latex and employ a gravity flow to deliver it to the molding position as shown, for example, in the Blair et al. Patent No. 2,441,235 for apparatus for making sponge rubber articles. It is also old to use a mechanical pressure feed to force foamed latex into a vulcanizing mold, but this mechanical feed tends to crush the foam and is otherwise unsatisfactory.

In producing foamed latex articles such as sponge rubber cushions it has been the usual practice to make up the foamed latex and pour it into an open mold, and then move the mold cover to the closed position, but in order to make sure that enough foamed latex is placed in the mold to fill all portions of the same when the cover is closed, it has been the practice to place an excess amount of foamed latex in the mold so that some will flow out around the edges as the cover is closed. This however wastes the material in the form of foam flash scrap.

The primary object of the present invention is to provide apparatus capable of forcing foamed latex into a closed mold under sufficient pressure to fill the mold quickly and completely without unduly crushing the foam; to thereby reduce waste of the foamed latex, and insure that the molds will be completely filled so as to produce high grade cushions.

This is accomplished by forcing liquid latex into a receptacle placed in a closed container provided with means for maintaining a higher than atmosphere air pressure therein, and by causing the latex to foam in such receptacle so that the above atmosphere pressure will serve to force the foamed latex out of the container and into a closed mold to fill the same.

By placing the receptacle in which the latex is foamed in a larger closed container having a slightly elevated air pressure, the latex is foamed while the air pressure remains the same inside and outside the cells of the foamed latex. It is this equal pressure inside and outside the cells that prevents the light creamy froth or foam from being crushed by the above atmosphere air pressure.

The various features of the present invention will be further understood from the following description when read in connection with the accompanying drawing disclosing one good practical embodiment of the invention and wherein:

Fig. 1 is a vertical sectional view through apparatus for producing foamed latex and forcing it into a closed mold; and Fig. 2 is a sectional view through a mold having the cover thereof raised.

The apparatus employed to foam the latex or other dispersion of rubber-like material within the air-tight container may be constructed as heretofore. It preferably consists of what is herein called a "prefrother" in which the latex is foamed or frothed, and a sensitizing tub which receives the frothed latex and mixes therewith a sensitizing fluid to cause the foamed latex to set quickly. The prefrother and sensitizing tub are mounted in said container and may, if desired, be constructed as disclosed in the above mentioned Blair et al. patent.

In accordance with the present invention the prefrother and sensitizing tub are mounted within an air tight container 10 having the top, bottom and side walls shown. In order to maintain an above atmosphere pressure within this container air under pressure is supplied thereto by a pipe 11 having a pressure reducing valve 12 of usual construction, and a pressure indicating gauge 13, and this air pipe is shown as leading to the interior of the container 10 through the top wall thereof. The container is also preferably provided with the safety valve 14 through which air may escape if an unduly high pressure should be established therein.

Within the air tight container 10 is mounted a prefrother comprising a substantially cylindrical receptacle 15 having a rounded lower end, and a discharge spout 16 near its upper end. Extending downwardly from the bottom of this receptacle is a small closed casing 17 which is supplied with air under pressure by a pipe 18 that extends inwardly through a wall of the container 10 and into the casing 17. This pipe is provided with the hand operated valve 19. The air supplied to the casing 17 passes upwardly through an aperture plate 20 provided between the casing 17 and lower end of the receptacle 15. Liquid latex containing a vulcanizing agent and other compounding ingredients is supplied by a pipe 21 having the hand valve 22. This pipe extends through the bottom wall of the container 10 and upwardly through the base of the casing 17 into the lower portion of the receptacle 15 as shown in Fig. 1. The arrangement is such that the foaming or frothing of the liquid latex is greatly facilitated by the air under pressure which passes upwardly through the apertures of the plate 20 to become dispersed throughout the mass of latex in the receptacle 15.

The foaming of the latex is further facilitated by a power driven whip or beater 23 which is rotated about its own axis and moves bodily around the interior of the receptacle 15 adjacent the side walls thereof with a planetary movement. This whip is driven by an electric motor 24 having the horizontally extending arm 25 which moves the whip bodily about the axis of the motor 24 and rotates it about its own axis. As the liquid latex is converted into foamed latex F and this foam rises to near the upper end of the receptacle 15 it will be discharged through the spout 16 into a sensitizing tub 26 which is also mounted within the air tight container 10 in position to receive the foam F as it is discharged from the spout 16.

It is highly desirable to add to the foamed latex a sensitizing fluid which will cause it to set quickly, but since this fluid speeds up the setting action of the latex it should not be added until shortly before the foamed latex is delivered to the mold or other container, where it is to set or become vulcanized to form a cellular mass of sponge rubber. The tub 26 is provided with a power driven whip or stirrer 27 that is driven by a motor 28 and is supported by a horizontally extending arm 29 so that this whip is rotated about its own axis and with a planetary movement about the axis of the motor, like the whip 23 above described. The horizontal arm 29 also has attached thereto the scrapper 30 adapted to scrape the foamed latex away from the walls of the tub 26.

The sensitizing fluid is supplied to the tub 26 in accurately controlled amounts by a pipe 31 having a hand operated valve 32, and this pipe 31 extends through a side wall of the container 10 and downwardly into the upper end of the tub 26.

Since the prefrother receptacle 15 and sensitizing tub 26 are both mounted within the pressurized container 10, and the latex is foamed in the receptacle 15 under this slightly elevated air pressure, the internal and external air pressure of the cells forming the latex foam will be the same. In this manner it is possible to subject the freshly formed latex foam to a slightly higher than atmospheric pressure without crushing the cells, and to employ this slightly elevated pressure to force the foam into all portions of the mold. The sensitizing agent causes the foam to set quickly in the mold to an irreversible porous gel, and after gelling the pores break down and become interconnected to form a porous sponge product.

The sensitized foamed latex is discharged from the lower end of the tub 26 through a pipe 33 that extends downwardly through the bottom wall of the container 10 as shown. The air within the closed container 10 is, as above stated, maintained at a pressure above room pressure, say one pound above the pressure of the air outside of the container 10. The effect of this is to maintain a head pressure upon the mass of foamed latex F within the tub 26 to force this foam out through the discharge pipe 33, and it is found from practice that it is necessary to agitate continuously the foamed latex in the tub 26, otherwise the air pressing down on the foam will force a hole through the foam leading to the discharge pipe 33.

The apparatus of the present invention so far described is shown as being employed to force the foamed latex into a closed mold. The discharge pipe 33 is therefore shown as having connected thereto the flexible pipe 34 having attached to its lower end a nozzle 35, which nozzle has a tapered end adapted to fit snugly in a correspondingly shaped hole 36 formed in the cover or top plate 37 for the mold receptacle 38. It is desirable to provide the discharge pipes 33, 34 with a quick acting valve so that the foamed latex being forced through the pipe 33 may be quickly and accurately controlled. Therefore a quick acting valve is provided having a casing 39 attached to the lower end of the discharge pipe 33 and upper end of the flexible pipe 34, and within this casing is provided a valve diaphragm 40 which is urged to its retracted or open position by a coil spring 41. This diaphragm is held in its closed position by compressed air supplied to the casing 39 by the pipe 42 to force the valve against its seat as shown in the drawing. Air under pressure is admitted to the casing 39 from the pipe 42 when a valve 43 is turned to one position and is exhaused from the casing through the outlet 44 when this valve is turned to a second position.

The mechanism described is illustrated in the drawing as employed to supply foamed latex to a closed mold of the general type used to produce sponge rubber cushions, but this mechanism may be employed to fill various types of molds with foamed latex. The mold shown in the drawing has its cover 37 attached by hinges 45 to the body portion 38, and attached to the inner face of the cover 37 are the protruding posts 46 adapted to project downwardly into the mass F of foamed latex to form holes in the finished cushion that extend inwardly from one face thereof in a well known manner. As the foamed latex is forced into the mold under pressure by the means shown the air confined therein will escape through small apertures 47 provided at the upper ends of the posts 46.

It is found in practice that the apparatus herein described works in a highly satisfactory manner to fill closed molds with foamed latex under pressure so as to fill completely the molds without unduly crushing the foam, and that by maintaining the air within the container 10 at a pressure of about one pound above the surrounding atmosphere a desired head pressure is produced upon the mass of sensitized foamed latex within the tub 26 that serves to force the foamed latex rapidly through the discharge pipes 33, 34 and into all portions of the closed molds without appreciably crushing the foam. The foam is forced into the closed mold 37, 38 until it can be seen in the air venting apertures 47, the appearance of the foam in these apertures shows that the mold is full. By employing the quick acting diaphragm valve shown one mold after another can be filled completely without spilling or wasting the foamed latex.

In order to speed up production it may be desirable to place the molds to be filled on a conveyor belt 48 adapted to convey them past the station where they are filled with foamed latex and then on to a vulcanizer, not shown. The container 10 is shown as supported by rails 49 above the conveyor belt 48. One wall of the container is preferably provided with a window 50 through which the operations can be observed.

The apparatus of the present invention serves to eliminate the foam flash scrap which is produced when the mold is filled while the cover is open, and the cover is then forced to the closed position so that some foam is forced out. The pressure feed serves also to fill the mold quickly and completely, so as to cause the foamed latex to conform to every portion of the interior of the mold and thereby produce well molded high quality cushions.

Having thus described my invention, what I claim and desire to protect by Letters Patent is:

1. Apparatus for filling vulcanizing molds with a foamed dispersion of a rubber-like material, comprising an air-tight container, a prefrother receptacle within the container and having a power driven beater to whip the material and tubes for supplying a liquid dispersion material and air to the lower portion of the receptacle, a sensitizing tub positioned in the container to receive the discharged foam from said receptacle, a foam delivery pipe leading from the bottom of the tub through a wall of the container to a closed mold, and means for maintaining an above atmosphere air pressure in the container to force the foamed material through said pipe into the closed mold without crushing the foam or subjecting it to an external air pressure greater than the air pressure within the foam cells.

2. Apparatus for filling vulcanizing molds with a foamed dispersion of a rubber-like material, comprising an air-tight container, a prefrother receptacle within the container and having means therein for foaming the rubber-like material, a sensitizing tub positioned in the container to receive the discharge foam from said receptacle, a foam delivery pipe leading from the tub through a wall of the container to a mold, and means for maintaining an above atmosphere air pressure in the container to force the foamed material through said pipe into the mold without crushing the foam or subjecting it to an external air pressure greater than the air pressure within the foam cells.

RAYMOND A. HERRLY.

REFERENCES CITED

The following references are of record in the file of this patent:

UNITED STATES PATENTS

| Number | Name | Date |
|---|---|---|
| 1,818,372 | Battilani | Aug. 11, 1931 |
| 2,114,275 | Murphy et al. | Aug. 12, 1938 |
| 2,156,508 | Minor | May. 2, 1939 |
| 2,441,235 | Blair et al. | May 11, 1948 |